United States Patent Office 3,386,805
Patented June 4, 1968

3,386,805
PROCESS OF SEPARATING NON-DIAMOND CARBONACEOUS MATERIAL FROM SYNTHETIC DIAMANTIFEROUS PRODUCTS
Francis J. Figiel, Boonton, N.J., assignor to Allied Chemical Corporation, New York, N.Y., a corporation of New York
No Drawing. Filed Apr. 21, 1966, Ser. No. 544,103
15 Claims. (Cl. 23—209.9)

This invention relates to a method of resolving carbonaceous materials and more particularly, provides a method of separating synthetic diamantiferous carbonaceous materials from residual quantities of non-diamond carbonaceous materials.

Various methods for the production of synthetic diamonds have been developed in recent years. One such method involves exposure of a non-diamond carbonaceous material such as graphite in the presence of a metal catalyst to temperatures sufficiently high to melt the metal or metal-carbon mixture while maintaining the pressure within the region of diamond stability. Another synthetic method for producing diamonds involves generating a shock wave through a body of carboniferous material, such as graphite, as is disclosed and claimed in U.S. Patent 3,238,019 and Belgian Patent No. 664,177. Synthetic diamantiferous materials having a hydrophilic surface exhibiting acidic properties, more particularly described in copending U.S. patent application Ser. No. 485,392, filed Sept. 7, 1965, of Francis J. Figiel and Raffaele F. Muraca, are also obtainable by controlled oxidation of crude diamantiferous materials produced by subjection of a non-diamond carbonaceous material to shock pressures within the region of diamond stability. In addition to the utilities exhibited by natural diamonds, diamonds produced by the synthetic methods described above have particular utility in polishing of gem stones, including natural diamonds; finishing of optical parts, such as lenses, windows, and lasers; in providing wear resistant surfaces by incorporation thereof in a stable matrix such as thermosetting resins or ceramic materials; and in plating of metal substrates thereby improving the load bearing characteristics of the substrate.

Unfortunately, the crude diamantiferous product resulting from these synthetic diamond producing methods normally is contaminated with gross amounts of unreacted non-diamond carbonaceous starting material, metal catalyst if one is employed, and other contaminants including refractory metals such as iron, boron, titanium and alumina as well as siliceous materials such as silica, adsorbed from the environment wherein the shock wave is generated when such method of diamond production is employed. The admixture of these contaminants with the diamantiferous material is undesirable in certain applications since they interfere with realization of the outstanding abrasion and hardness properties characteristic of the diamantiferous material. Hence, when using the diamantiferous material in polishing operations, the presence of unreacted non-diamond carbonaceous starting material is undesirable since this contaminant, itself unable to accomplish the desired result, covers the material to be polished and precludes contact of the diamond with the surface to be polished. Similarly, when the synthetic diamantiferous material contaminated with unreacted non-diamond carbonaceous starting material is incorporated in a matrix, the desired wear resistant surface properties are unobtainable due to the lack of wear-resistance qualities of the contaminants present therein. Accordingly, subsequent separation or purification procedures must be employed after obtainment of the diamantiferous material from synthetic producing methods to effect recovery of the desired individual diamond particles.

Non-diamond carbonaceous contaminants, metals, and other inorganic impurities are conventionally removed by treatment of the synthetic diamantiferous reaction product with an acid medium, such as fuming red nitric acid, hydrochloric acid, perchloric acid and hydrofluoric acid, which have the effect of dissolving a major portion of the non-diamantiferous constituents of the reaction product. However, substantially complete removal of residual quantities of non-diamantiferous carbonaceous contaminants by these conventional methods, in general, has not been realized without prolonged contact of the acid medium with the crude diamantiferous reaction product thereby resulting in excessive losses of the desired diamantiferous material. Moreover, in certain instances, particularly when the synthetic diamantiferous reaction product is obtained by generating a shock wave through a body of a carboniferous material and/or by chemical oxidation of such crude synthetic diamantiferous product, the diamond particles are so intertwined with the unconverted non-diamond carbonaceous starting material that essentially complete removal of the non-diamond contaminants by methods conventionally employed is impossible. In addition, since the diamantiferous material is so embedded within pockets of unreacted non-diamond carbonaceous starting material, contact thereof with the acid treating agents conventionally employed for any extended period of time will result in exceptionally high losses of the desired diamantiferous product.

Accordingly, one object of the present invention is to provide a process for resolving a synthetically produced diamantiferous reaction product comprised of mixtures of diamond and non-diamond carbonaceous materials.

Another object of the invention is to provide a method for separating a synthetically produced diamantiferous material from residual quantities of non-diamond carbonaceous contaminants without appreciable loss of the desired diamantiferous constituents.

A further object of the invention is to provide a method of purifying a synthetically produced diamantiferous reaction product contaminated with residual quantities of non-diamond carbonaceous materials to produce a diamantiferous product substantially free of non-diamond carbonaceous contaminants.

A still further object of the present invention is the provision of a process for the recovery of diamantiferous material substantially free of residual quantities of non-diamond carbonaceous contaminants and other inorganic impurities from a crude synthetic diamantiferous reaction product obtained by generation of a shock wave through a body of a carboniferous material and/or by chemical oxidation of such crude synthetic diamantiferous product.

It has now been discovered that residual quantities of non-diamond carbonaceous as well as other inorganic contaminants may be separated from a synthetically produced diamantiferous material provided that said crude material is conditioned with certain inorganic bases at elevated temperatures after a major portion of said contaminants have been removed by conventional separatory procedures. Furthermore, conditioning of the crude diamantiferous product containing residual quantities of non-diamond carbonaceous contaminants under the conditions of the present invention substantially completely liberates the synthetic diamond particles from the crude diamantiferous reaction product thereby permitting obtainment of a diamentiferous product substantially free of non-diamond carbonaceous contaminants, generally containing quantities less than that detectable by X-ray diffraction methods. In addition, appreciable losses of the diamantiferous product due to prolonged contact with an acid medium are avoided, if such initial separatory method is employed. Also, essentially complete recoveries of the diamantiferous constituents present in the crude product may be realized by the present process.

In accordance with the present invention, there is provided a process for resolving an agglomerate mixture of (a) a synthetic diamantiferous material and (b) a non-diamond carbonaceous material which method comprises treating said mixture with a sufficient quantity of an inorganic base selected from the group consisting of an alkali metal hydroxide, alkali metal carbonate and mixtures thereof at a temperature of at least the melting point of said base, thereby forming a liquid and a solid fraction, said liquid fraction comprising a melt containing said synthetic diamantiferous material suspended therein and said solid fraction, floating on the surface of the melt, comprising said non-diamond carbonaceous material and thereafter, separating said liquid and solid fractions. Such separation of the solid and liquid fractions may be readily effected by conventional physical and/or chemical separation techniques.

In general, the crude diamantiferous product resulting from the synthetic preparatory method contains minor amounts, for example, less than about 25%, based on the carbon content, of desired diamond product which is usually contaminated with gross amounts of unreacted non-diamond carbonaceous and, in some instances, depending upon the source of the synthetic diamantiferous product, may additionally have associated therewith other inorganic impurities such as refractory metals, metals employed as catalyst in the production of the crude diamantiferous material, as well as siliceous impurities. Accordingly, when it is desired to obtain a diamantiferous material substantially free of residual quantities of non-diamond carbonaceous contaminants detectable by X-ray analysis, it is necessary to remove a major portion of said non-diamond carbonaceous contaminants and any other inorganic impurities if present, prior to subjection of the contaminated diamantiferous material to the process of the present invention. Such removal may be effected by any conventional physical or chemical separatory method, as by directly contacting the crude diamantiferous material resulting from the synthetic preparatory method with at least one acid medium of the type described above. By removal of a major portion of said non-diamond carbonaceous contaminants and other inorganic impurities, if these be present, is meant that the non-diamond carbonaceous contaminant content is not greater than about 40%, preferably not greater than about 10%, and any remaining inorganic impurity content, if such impurities be present, is less than about 5%, preferably less than about 2%, based on the total solid content of the acid treated crude diamantiferous material. It should be understood, however, that no preliminary separatory processing is required when a diamantiferous product substantially free of non-diamond carbonaceous materials is not desired.

After the above referred to solid and liquid fractions have been separated, the desired diamantiferous material may be recovered from the inorganic base melt by any conventional manner, as by dissolution thereof in water which has the effect of dissolving all of the inorganic base content of the melt. However, when the crude diamentiferous material has associated therewith inorganic impurities other than non-diamond carbonaceous contaminants, these impurities are normally dispersed in the inorganic base melt under the conditions of the present process. In this case, separation of these inorganic impurities from the diamantiferous material recovered from the melt is effected by conventional procedures, as by treatment thereof with a dilute mineral acid, illustratively, 30% hydrochloric acid, which dissolves essentially all of the inorganic impurities admixed with the diamantiferous material recovered from the melt.

When conducting the process of the present invention, the synthetically produced crude diamantiferous material may be contacted with the inorganic base prior or subsequent to bringing the base to its melting temperature. It is preferred, however, to first contact the agglomerate mixture with a solid inorganic base, heat the resulting mixture to at least the melting point of said base, thereby substantially completely solubilizing said base and forming a suspension containing said mixture of diamantiferous and non-diamond carbonaceous materials and agitating said suspension while maintaining the temperature thereof at least above the melting point of said base for a period of time sufficient to form said liquid and solid fractions. In addition, even though it is apparent that only a portion of the inorganic base contacted with the crude agglomerate mixture need be solubilized, it is desirable to substantially completely solubilize all of the base present in the reaction zone thereby insuring economical levels of operation. Any alkali metal hydroxide such as potassium hydroxide and sodium hydroxide or alkali metal carbonate such as potassium carbonate or sodium carbonate as well as mixtures thereof may be employed in the process; potassium hydroxide constitutes the preferred base suitable for effecting the purification process of the invention.

In general, it is desirable to contact the synthetically produced crude agglomerate mixture with sufficient quantities of inorganic base to accommodate the liberated diamantiferous material particles and to form a distinct liquid fraction so that separation of the liquid and solid fractions formed during the process may be readily facilitated. Accordingly, the synthetically produced crude agglomerate mixture is normally contacted with at least an equivalent weight of inorganic base, although at least about 4 to 20 parts, on a weight basis, of inorganic base per part of crude agglomerate mixture are preferred.

As previously indicated, it is required that at least a portion of the inorganic base be brought to its melting point in carrying out the separation process of the invention. Although the purification process may be carried out under subatmospheric or superatmospheric pressures in the range of about 0.5 to 10 atmospheres, atmospheric pressures have proven to be particularly satisfactory. Hence, at atmospheric pressures, inorganic base temperatures in the range from about 320° C. to the boiling point of the base may be advantageously employed. Illustrative temperatures employable for the preferred base of the invention, potassium hydroxide, may range from about 375° to 900° C.

The conditioning time required to effect the requisite degree of purification will of course depend on the nature and temperature of the base as well as the nature and amount of impurities present. In general, since the densities of the diamantiferous and non-diamond carbonaceous materials are markedly different, sufficient conditioning of the crude agglomerate mixture is achieved if the inorganic base is brought to at least its melting temperature with agitation. When the solid fraction floating on the surface of the melt is separated from the melt by physical separatory procedures, as by decantation or by other skimming methods, it is generally necessary to condition the melt at at least its melting temperature for a period of at least about 5 minutes, preferably 20 to 60 minutes, especially if substantially complete separation of the diamantiferous material from non-diamond carbonaceous materials, and if present, other inorganic impurities, is to be effected.

Although the solid fraction, floating on the surface of the melt, comprising the non-diamond carbonaceous material may be readily separated by conventional physical separation methods as by decantation or skimming, separation of this solid fraction from the melt containing the desired synthetic diamantiferous material is preferably effected by destruction thereof with an oxidizing gas. This destructive separatory procedure advantageously may be carried out by contacting the solid fraction with a molecular oxygen containing gas which may be introduced either below or above the liquid level of the melt. Although air is the preferred oxidizing agent, molecular oxygen or other agents capable of effecting oxidation of the solid fraction containing non-diamond carbonaceous material may also be employed. Thus, for example, the oxidation treatment may be carried out with any compound which under the reaction conditions employed, will decompose to give a molecular oxygen containing gas. In general, this oxidation treatment is carried out for a time sufficient to effect disappearance of any visible black carbonaceous material floating on the surface of the melt, particularly when substantially complete removal of the non-diamond carbonaceous material is desired.

The invention will be further described with reference to the following specific examples, it being understood that these examples are given for purposes of illustration only and are not to be taken as in any way limiting the invention beyond the scope of the appended claims.

Example 1

A synthetically produced diamantiferous material having a carbon content of 87.4%, a hydrogen content of 1.4% and a nitrogen content of 1.8%, as determined by microanalytical examination, and containing 2.50% graphite determined by X-ray diffraction analysis and minor amounts of silicon, boron, titanium, aluminum and calcium, determined by emission spectrographic analysis, was employed as a starting material in this example.

A 15 gram sample of this material was mixed with 100 grams of solid potassium hydroxide pellets in a nickel crucible. The potassium hydroxide pellets contained in the crucible were brought to a melt by heating the crucible on a hot plate having a surface temperature of about 400° C. for about 60 minutes. The crucible was heated over a free flame for about 5 minutes thereby bringing the melt to a temperature of about 800° C. and was then placed on the hot plate for a period of about 15 minutes. During this latter period, continuous formation of a solid fraction, a black carbonaceous material on the surface of the melt was observed. When it appeared that additional quantities of the black carbonaceous material were no longer being floated to the surface of the melt, the solid fraction comprising the black carbonaceous material was separated from the surface of the melt by applying suction through a heated nickel tube, positioned approximately between the solid and liquid fraction layers.

The liquid fraction containing the melt having the desired diamantiferous material suspended therein was withdrawn from the crucible and simultaneously cooled to room temperature by being introduced into a vessel containing water which had the effect of the dissolving essentially all of the potassium hydroxide content of the melt. The solid diamantiferous material was removed from the water by decantation, washed with distilled water, 30% hydrochloric acid for removal of any entrained base or other inorganic impurities, and with distilled water to remove any adsorbed acid and finally dried at 200° C. for a period of 12 hours. X-ray diffraction patterns of this product indicated the presence of diamonds with no detectable graphite (less than 0.2%) and emission spectrographic examination indicated the presence of less than about 0.2% of other inorganic impurities.

X-ray analysis of the separated solid fraction, after being worked up in an identical manner as the liquid fraction, showed that this fraction was predominantly composed of graphite and contained only trace quantities of dimantiferous product.

Example 2

In this example, a synthetically produced diamantiferous material having a carbon content of 89.0%, a hydrogen content of 0.8% and a nitrogen content of 2.0%, containing 1.0% graphite and minor amounts of silicon, titanium, aluminum and boron served as starting material in the process.

A 25 gram sample of this material was mixed with 150 grams of potassium hydroxide pellets in a nickel crucible of the type employed in Example 1. The resulting mixture was then conditioned in accordance with the procedure described in the preceding example. As soon as formation of the solid fraction comprising the black carbonaceous material was observed, air, at a rate of 6 ml. per sec. was introduced into the crucible through a nickel tube below the liquid level of the melt. The introduction of air was continued until disappearance of any visible black carbonaceous material floating on the surface of the melt was effected (a period of about 60 minutes). The melt having the desired solid diamantiferous material suspended therein was then contacted with water to effect dissolution of the potassium hydroxide content contained therein. The solid diamantiferous material was then worked up in a manner analogous to that employed in the preceding example. X-ray diffraction patterns of this product indicated the presence of diamonds with no detectable amount of graphite (less than 0.2%) and emission spectrographic examination indicated the presence of less than 0.1% of other inorganic impurities.

The synthetic diamantiferous material which served as a starting material in above Examples 1 and 2 was obtained by the nitric acid oxidation of a crude diamantiferous material produced by subjection of a carboniferous material to shock pressures within the region of diamond stability as described in copending U.S. application Ser. No. 485,392 of Francis J. Figiel and Raffaele F. Muraca, filed Sept. 7, 1965. In this oxidation process, the crude diamantiferous material is generally contacted with an inorganic acid such as hydrochloric acid and/or hydrofluoric acid for removal of major quantities of non-diamond carbonaceous, inorganic and siliceous impurities prior to the nitric acid oxidation. The disclosure of this Figiel and Muraca application is hereby incorporated by reference into the present application.

Substantially similar results may be obtained by employment of other alkali metal hydroxides or carbonates, illustratively sodium hydroxide, potassium carbonate and sodium carbonate, as a conditioning agent in the separation process of the invention. Moreover, effective separation of non-diamond carbonaceous materials other than natural or artificial graphite, such as graphitic carbons, petroleum coke, coal coke and lamp-black, from synthetically produced diamantiferous materials may be advantageously realized by the present process. These non-diamond carbonaceous materials serve as starting materials for the above described synthetic diamond producing methods, the crude reaction products resulting therefrom likewise being subjectable to the process of the present invention.

I claim:

1. A process for resolving an agglomerate mixture of (a) a synthetic diamantiferous material and (b) a non-diamond carbonaceous material which comprises treating said mixture with a sufficient quantity of an inorganic base selected from the group consisting of an alkali metal hydroxide, alkali metal carbonate and mixtures thereof at a temperature of at least the melting point of said base, thereby forming a liquid and a solid fraction, said liquid fraction comprising a melt containing said synthetic diamantiferous material suspended therein and said solid fraction, floating on the surface of the melt, comprising said non-diamond carbonaceous material, and thereafter, separating said liquid and solid fractions.

2. The process of claim 1 wherein said treatment is effected by contacting the agglomerate mixture of synthetic diamantiferous and non-diamond carbonaceous materials with at least an equivalent weight of said inorganic base, heating the resulting mixture to at least the melting point of said base, thereby substantially completely solubilizing said base and forming a suspension containing said mixture of diamantiferous and non-diamond carbonaceous materials and agitating said suspension while maintaining the temperature thereof at least above the melting point of said base for a period of time sufficient to form said liquid and solid fractions.

3. The process of claim 1 wherein the non-diamond carbonaceous material is graphite.

4. The process of claim 1 wherein the inorganic base is potassium hydroxide.

5. The process of claim 1 wherein the solid fraction is separated by oxidation thereof with a molecular-oxygen containing gas.

6. The process of claim 1 wherein the agglomerate mixture is derived from the oxidation of a crude diamantiferous material produced by subjection of a non-diamond carbonaceous material to shock pressures within the region of diamond stability.

7. A process for purifying a crude synthetic diamantiferous material containing residual quantities of non-diamond carbonaceous impurities which comprises (1) treating said crude synthetic diamantiferous material with a sufficient quantity of an inorganic base selected from the group consisting of an alkali metal hydroxide, alkali metal carbonate and mixtures thereof at a temperature of at least the melting point of said base, thereby forming a liquid and a solid fraction, said liquid fraction comprising a melt containing said synthetic diamantiferous material suspended therein and said solid fraction, floating on the surface of the melt, comprising said non-diamond carbonaceous material, (2) separating said liquid and solid fractions, and thereafter, (3) recovering a diamantiferous material substantially free of non-diamond carbonaceous impurities from said liquid fraction.

8. The process of claim 7 wherein said treatment is effected by contacting the crude synthetic diamantiferous material with at least an equivalent weight of said inorganic base, heating the resulting mixture to at least the melting point of said base, thereby substantially completely solubilizing said base and forming a suspension containing said crude diamantiferous material and agitating said suspension while maintaining the temperature thereof at least above the melting point of said base for a period of time sufficient to form said liquid and solid fractions.

9. The process of claim 7 wherein the non-diamond carbonaceous impurity is graphite.

10. The process of claim 7 wherein the inorganic base is potassium hydroxide.

11. The process of claim 7 wherein the solid fraction is separated by oxidation thereof with a molecular oxygen-containing gas.

12. The process of claim 7 wherein the crude synthetic diamantiferous material additionally has associated therewith minor quantities of refractory metals and siliceous impurities.

13. The process of claim 7 wherein the agglomerate mixture is derived from the oxidation of a crude diamantiferous material produced by subjection of a non-diamond carbonaceous material to shock pressures within the region of diamond stability.

14. The process of claim 8 wherein the ratio of crude synthetic diamantiferous material to inorganic base is at least 1:4, based on the total weight of said resulting mixture.

15. The process of claim 14 wherein the temperature of the base is between about 450° C. and 800° C.

References Cited

UNITED STATES PATENTS

| | | | |
|---|---|---|---|
| 2,947,610 | 8/1960 | Hall et al. | 23—209.1 |
| 3,238,019 | 3/1966 | De Carli | 23—209.1 |

OTHER REFERENCES

Berger, "Chemical Abstracts," vol. 15, 1921, p. 1194.

Young et al., "Chemical Abstracts," vol. 45, 1951, col. 8221.

Phinney, "Science," vol. 120, July 16, 1954, p. 114.

EDWARD J. MEROS, *Primary Examiner.*